United States Patent [19]
Forrester

[11] Patent Number: 6,113,347
[45] Date of Patent: Sep. 5, 2000

[54] BLADE CONTAINMENT SYSTEM

[75] Inventor: James M. Forrester, Springboro, Ohio

[73] Assignee: General Electric Company, Cincinnati, Ohio

[21] Appl. No.: 09/221,401

[22] Filed: Dec. 28, 1998

[51] Int. Cl.[7] .................................................. F01D 21/00
[52] U.S. Cl. ........................... 415/9; 415/173.4; 415/197; 415/200
[58] Field of Search .............................. 415/9, 197, 200, 415/173.4, 174.4; 428/469, 325

[56] References Cited

U.S. PATENT DOCUMENTS

| | | | |
|---|---|---|---|
| 3,042,365 | 7/1962 | Curtis et al. | 415/173.4 |
| 4,197,052 | 4/1980 | Lardellier | 415/9 |
| 4,764,089 | 8/1988 | Strangman | 415/174 |
| 5,403,148 | 4/1995 | Forrester | 415/9 |
| 5,486,086 | 1/1996 | Bellia et al. | 415/9 |

FOREIGN PATENT DOCUMENTS 59-115403  7/1984  Japan .................................. 415/173.4

*Primary Examiner*—Edward K. Look
*Assistant Examiner*—Liam McDowell
*Attorney, Agent, or Firm*—Andrew C. Hess; Nathan D. Herkamp

[57] ABSTRACT

A blade containment system for turbomachinery includes an annular casing having an interior surface with an abrasive surface texture that is capable of dulling sharp corners and edges of impacting fan blades so as to reduce the ability of the fan blade to pierce the containment casing. The textured surface can be produced by either a plurality of protuberances attached thereto or a plurality of sharp dimples formed therein. The protuberances can be in the form of sawtooth steps, sharp spikes or pieces of a hard material impregnated in the textured surface. In one preferred embodiment, the textured surface is formed on a plurality of tiles secured to the interior surface of the containment casing.

23 Claims, 3 Drawing Sheets

's interior surface. When struck by a fan
BLADE CONTAINMENT SYSTEM

BACKGROUND OF THE INVENTION

This invention relates generally to blade containment systems for turbomachinery and more particularly to a blade containment system for gas turbine engines having a textured surface that dulls sharp corners and edges of impacting fan blades.

Numerous applications exist for turbomachinery, such as gas turbine engines used to propel a variety of aircraft. One such gas turbine engine is the high bypass turbofan engine, which typically includes a large, ducted fan placed at the front of the engine. The fan serves to produce greater thrust and reduce specific fuel consumption. During the operation of such engines, there is a remote possibility that a foreign body, such as a bird, could impact the fan and cause severe fan damage. That damage could result in part or all of a fan blade becoming detached from the hub and impacting the fan casing. Such a detached fan blade could cause considerable damage to the aircraft powered by the engine if it were not contained by the fan casing. Similar damage could also result if the fan blade suffered failure through fatigue.

In order to prevent such damage, various containment systems have been employed. Fan blade containment systems have traditionally included an annular containment casing manufactured from a high strength material with an adequate radially extending shell thickness to absorb the kinetic energy of an impacting fan blade. More recent containment systems have employed various nesting areas defined by inner and outer annular casings which may include honeycomb structures therein. In addition, ballistic material such as an aromatic polyamide fiber may be wrapped around the casing structure.

Typically, a fan blade released from the hub will obliquely impact the containment structure such that an outer edge or corner of the fan blade will make initial contact with the containment structure. Under such circumstances, the impacting load is concentrated in a relatively small area, which means that the released fan blade can inflict damage to the containment structure and the engine, and could possibly pass completely through the containment casing.

One containment system that addresses this problem is disclosed in U.S. Pat. No. 5,403,148 issued Apr. 4, 1995 to James M. Forrester. This system provides a protective barrier positioned on the interior surface of the containment casing to serve as a ballistic barrier in the event that one or more blades are released. The barrier is formed by securing a number of tiles to the interior surface of the containment casing. The tiles form a substantially continuous barrier layer over the casing blade, one or more tiles impacted by the blade serve to distribute the impact, so as to enhance the ability of the containment casing to withstand the impact. The tiles are formed from a hard material, such as a ceramic composite, which promotes the ability of the tiles to distribute a highly localized impact inflicted by a fan blade. The use of the tiles is compatible with typical structure and design configurations of turbofan engines and can accommodate acoustic liners that are typically installed in the forward section of the containment casing.

In addition to deflecting and distributing the force of the impact, the barrier of U.S. Pat. No. 5,403,148 has also been found to dull the sharp edges and corners of the fan blade upon impact, so as to further reduce the ability of the fan blade to pierce the containment casing. The dulling action of the barrier is attributed to the fact that when a blade is released, it impacts the barrier obliquely and travels perpendicularly across the junctions between adjacent tiles. Thus, these junctions, which define small discontinuities in the barrier layer, provide a source of planing action on the fan blade that removes slivers of material from the impacting blade. However, while the tile junctions do cause removal of material from an impacting blade, the degree to which the blade is dulled is limited by the number of junctions that can be feasibly provided in the barrier.

Accordingly, it would be advantageous to provide an improved containment casing for turbomachinery in which the capability of the barrier to dull an impacting blade is enhanced.

SUMMARY OF THE INVENTION

The above-mentioned needs are met by the present invention which provides a blade containment system for turbomachinery. The blade containment system includes an annular casing having an interior surface with an abrasive surface texture that is capable of dulling sharp corners and edges of impacting fan blades so as to reduce the ability of the fan blade to pierce the containment casing. The textured surface can be produced by either a plurality of protuberances attached thereto or a plurality of sharp dimples formed therein. The protuberances can be in the form of sawtooth steps, sharp spikes or pieces of a hard material impregnated in the textured surface. In one preferred embodiment, the textured surface is formed on a plurality of tiles secured to the interior surface of the containment casing.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
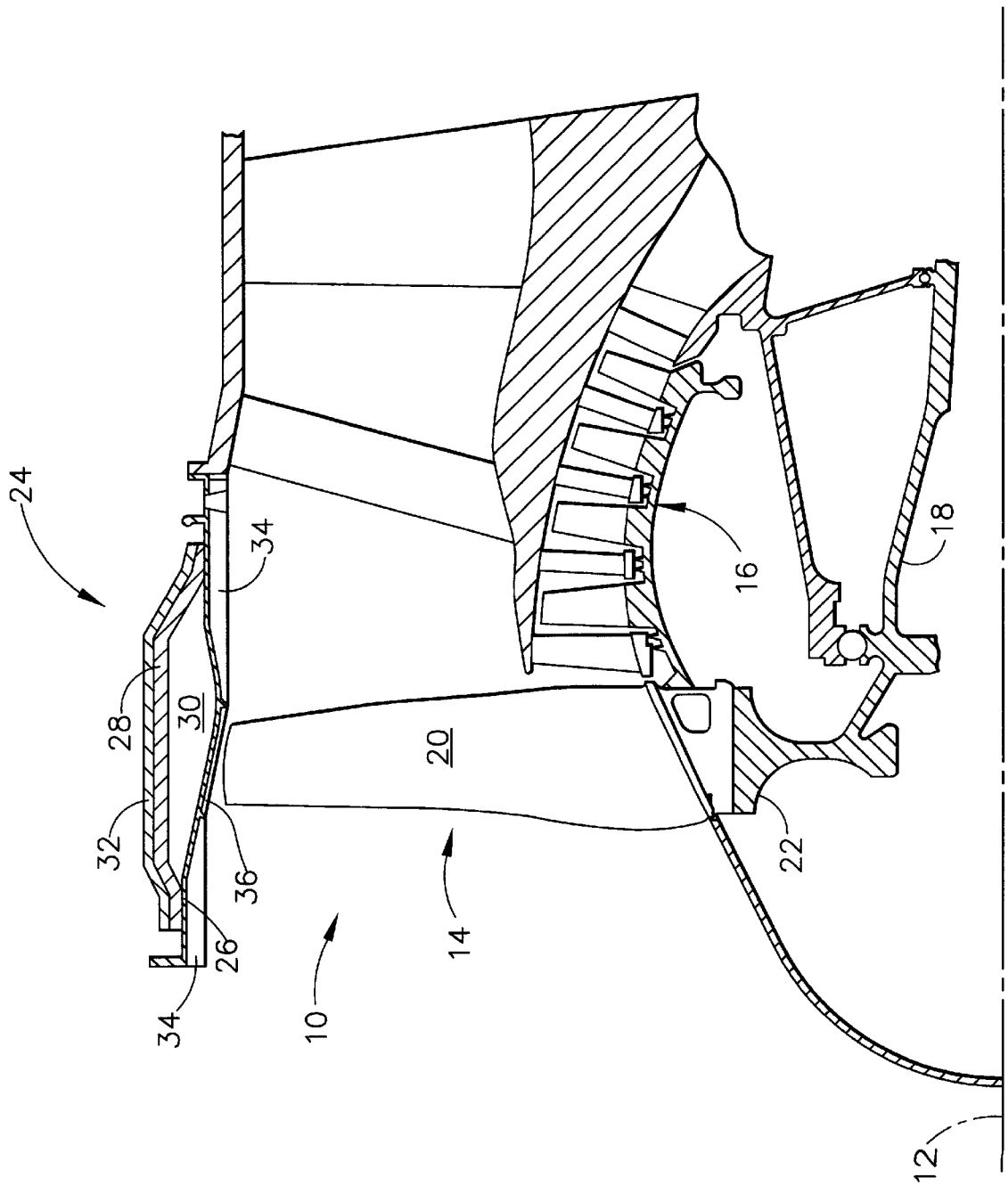
FIG. 1 is a longitudinal cross-sectional view illustrating an exemplary high bypass ratio turbofan engine incorporating the blade containment system of the present invention.

Referring to the drawings wherein identical reference numerals denote the same elements throughout the various views, FIG. 1 illustrates a longitudinal cross-sectional view of an exemplary high bypass ratio turbofan engine 10. The engine 10 includes, in serial axial flow communication about a longitudinal centerline axis 12, conventional structures including a fan rotor 14 and a booster 16. The other conventional structures of the engine 10, such as a high pressure compressor, combustor, high pressure turbine, and low pressure turbine are not shown for clarity of illustration. The fan rotor 14 and booster 16 are drivingly connected to the low pressure turbine via a rotor shaft 18. The fan rotor 14 comprises a plurality of radially extending blades 20 (only one of which is shown in FIG. 1) mounted on an annular disk 22, wherein the disk 22 and the blades 20 are rotatable about the longitudinal centerline axis 12 of engine 10.

The engine 10 also includes a blade containment system, generally depicted at 24. The blade containment system 24 comprises an annular containment casing 26 that is positioned radially outward of the blades 20 and in surrounding relationship therewith. An outer shell 28 is spaced radially outward of the casing 26 and is attached to the casing 26 at upstream and downstream locations so as to define a chamber 30 therebetween. Chamber 30, which is also known as a nesting area, preferably includes a honeycomb structure (not shown) which is used to retain broken blades or blade fragments therein. A ballistic material 32, such as an aromatic polyamide fiber, is wrapped around the outer surface of the outer shell 28. Acoustic liners 34 are affixed to the interior surface of the containment casing 26 at locations fore and aft of the blades 20. The section of the containment casing 26 which is axially aligned with the fan blades 20 preferably does not include acoustic liners. It is noted that although FIG. 1 depicts a blade containment system of the type utilizing a nesting area with honeycomb structures therein and a ballistic material wrap, the present invention can also be used with blade containment systems of the type having a single containment casing made from a high strength material.

Figure 2:
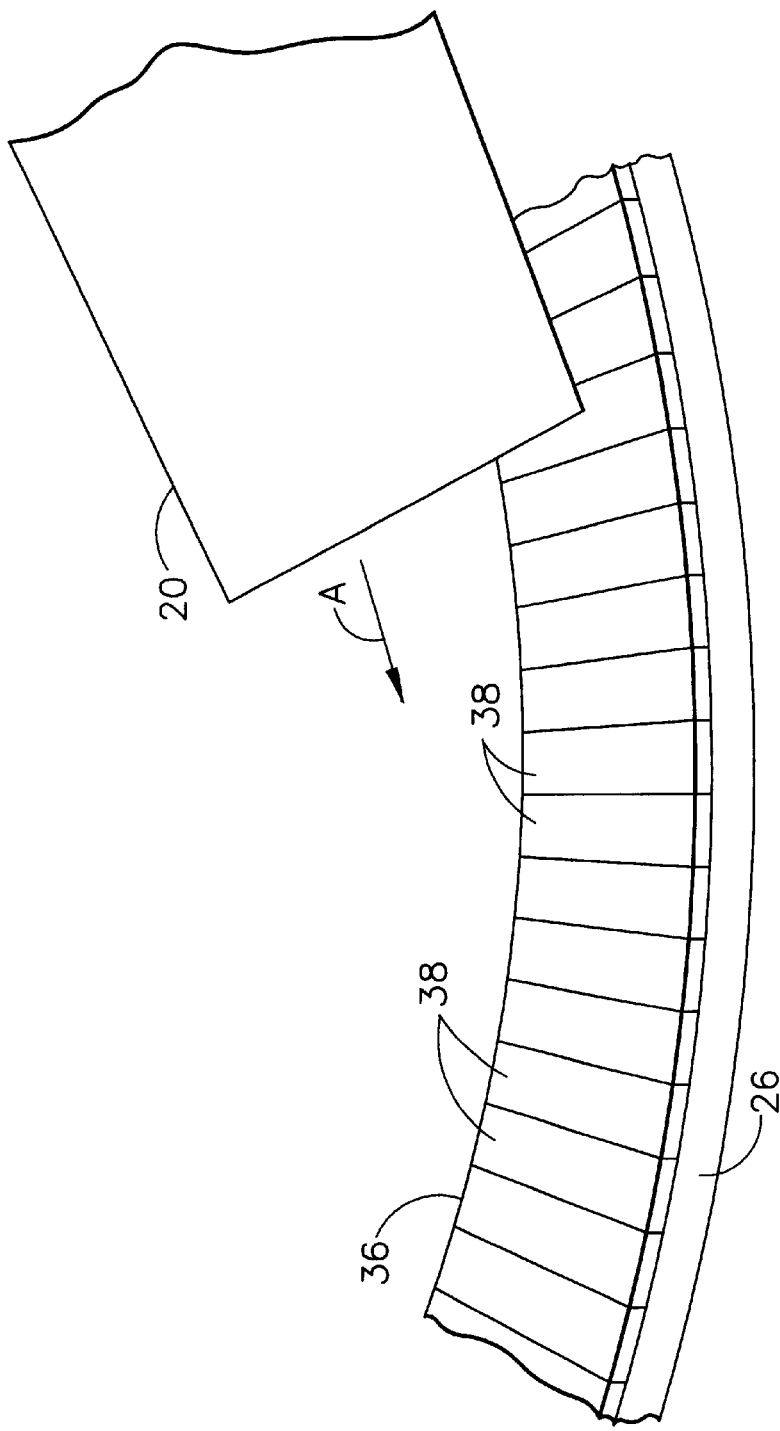
FIG. 2 is a fragmentary perspective view of the interior of the containment casing depicted in FIG. 1.

In a first embodiment, the blade containment system 24 includes a ballistic barrier 36 which is secured to the interior surface of the containment casing 26 in the section thereof which is axially aligned with the fan blades 20. As best shown in FIG. 2, the barrier 36 is composed of a number of elongated tiles 38 which are abutted side by side so as to form a continuous barrier over the interior circumferential surface of the containment casing 26. In accordance with the present invention, the tile surfaces facing the fan blades 20 are provided with a roughened or abrasive surface texture. This feature, which is described in more detail below, will dull the sharp edges and corners of a fan blade impacting thereon, thereby reducing the ability of the fan blade to pierce the containment casing 26.

The tiles 38 are preferably formed from a ceramic composite material characterized by a hardness and compressibility that are greater than that of the material from which the fan blades 20 are formed. A preferred ceramic composite material is composed of silicon carbide (SiC) particles within an aluminum oxide ($Al_2O_3$) matrix, as is known in the art. Such tiles 38 can be formed by pressing a suitable quantity of silicon carbide powder so as to form a preform, which is then placed on a quantity of aluminum. The aluminum is subsequently melted in air, thereby reacting with oxygen to form aluminum oxide, which then wicks up into the silicon carbide preform so as to form a matrix surrounding the silicon carbide particles. Preferably, the silicon carbide constitutes about 50 to about 60 percent of the weight of each tile 38. The above processing technique is generally known in the art. Furthermore, numerous other methods are known for forming ceramic composite materials, any of which may potentially be suitable for forming the tiles 38.

An advantage of the preferred silicon carbide/aluminum oxide composite material, as well as many other ceramic materials, is its relatively low density compared to steels. Generally, the preferred material for the tiles 38 has a density of about ⅓ that of steel. In practice, tiles 38 formed from the preferred composite material are able to withstand the impact of a projectile as well as steel plates of greater thicknesses. As a result, the barrier 36 contributes minimal additional weight to the turbofan engine 10 for a given degree of protection.

The tiles 38 are preferably adhered to the interior surface of the containment casing 26 with a suitable adhesive. While numerous adhesives are potentially suitable, a preferred adhesive is a polysulfide adhesive of the type known in the art. Such adhesives are preferred in that they are capable of high strain that occurs as a result of temperature differentials and different coefficients of thermal expansion for the tiles 38 and the containment casing 26. In addition, the adhesive's ability to withstand high strain serves to enhance the ballistic capability of the barrier 36.

Generally, the shape of the tiles 38 is limited only by the size of the area to be covered by the barrier 36, and the ability of the tiles 38 of a given shape to uniformly distribute a localized impact. As shown, the tiles 38 are generally rectangular and extend the entire axial length of the section of the containment casing 26 that they cover. Alternatively, the tiles 38 could have a square shape, with a number of tiles 38 being abutted axially as well as circumferentially. Although the tiles 38, and hence the abrasive surface texture, are shown in the Figures as being applied to the section of the containment casing 26 that is axially aligned with the fan blades 20, it should be noted that tiles 38 could also be secured to the interior surface of the containment casing 26 at locations fore and aft of the blades 20. In this case, the tiles 38 would be disposed between the containment casing 26 and the acoustic liners 34 such that the tiles 38 would not interfere with the operation of the liners 34.

In practice, the required thickness of the tiles 38 has been determined empirically, and may vary widely from as low as about 2 millimeters to as thick as the containment casing 26. Tiles 38 having thicknesses within this range have been empirically determined to sufficiently protect the underlying containment casing 26 by distributing and deflecting a highly localized impact, even though the tile 38 is shattered by the impact. However, it is foreseeable that the dimensions of the tiles 38 can be substantially altered and yet achieve the capability desired by this invention.

Figure 3:
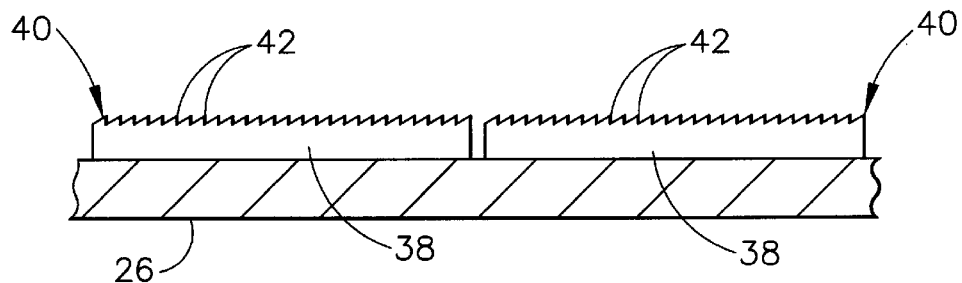
FIG. 3 is an enlarged cross-sectional view showing a textured surface of the containment casing.
Figure 4:
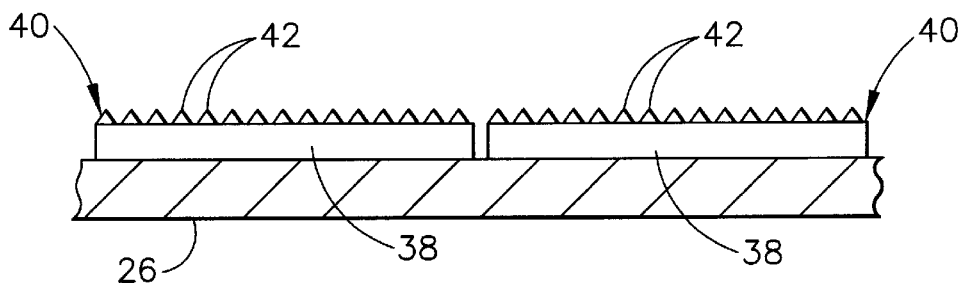
FIG. 4 is an enlarged cross-sectional view showing another textured surface of the containment casing.
Figure 5:
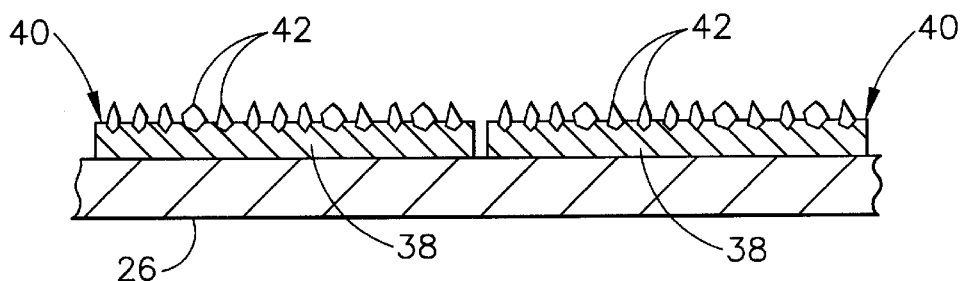
FIG. 5 is an enlarged cross-sectional view showing a third textured surface of the containment casing.

As seen best in FIGS. 3–5, the surface 40 of each tile 38 that faces the fan blades 20 is provided with a roughened or abrasive surface texture. Thus, during operation of the engine 10, if a fan blade 20 is released and propelled into the containment casing 26, the blade 20 will make initial contact with the textured surface 40, and the blade's momentum will cause it to travel across the textured surfaces 40 of adjacent tiles 38 (in the direction of arrow A shown in FIG. 2). The abrasive surface texture of surfaces 40 will produce a planing action that will dull the sharp edges and corners of the fan blade 20. Specifically, as the blade 20 travels across the textured surfaces 40, slivers of blade material will be removed from the edge or corner of the blade 20 that is in contact with the textured surfaces 40. Thus, the surface area of the blade 20 that is in contact with the tiles 38 will be continuously increasing so that the impacting load of the blade 20 will be distributed over a larger and larger area, greatly diminishing the blade's ability to pierce the containment casing 26. Furthermore, because of the rapid increase in surface area caused by the textured surfaces 40, it is likely that the blade 20 will never fully penetrate the tiles 38 to directly contact the casing 26.

The textured surface 40 can be produced by providing a plurality of protuberances 42 thereon. As shown in FIG. 3, the protuberances 42 can be in the form of sawtooth steps integrally formed in the surface 40 of the tiles 38. The sawtooth steps are oriented against or facing the direction of rotation of the blades 20. FIG. 4 shows another alternative in which the protuberances 42 are sharp spikes formed on the surface 40. FIG. 5 shows yet another alternative in which the protuberances 42 comprise small bits or pieces of a hard material impregnated in the surface 40 so that some parts of the pieces protrude beyond the surface to create the abrasive texture. Examples of suitable materials include industrial grade diamonds, boron and tungsten carbide. The height and thickness of the protuberances 42, which must be such that they will resist breaking off in the event of a blade impact, will vary in accordance with several factors including tile thickness.

Figure 6:
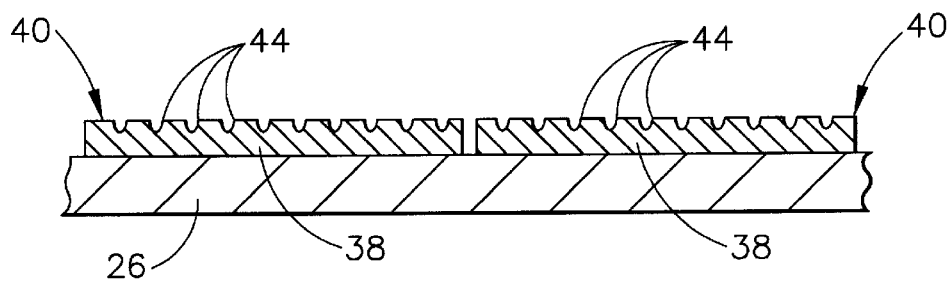
FIG. 6 is an enlarged cross-sectional view showing a fourth textured surface of the containment casing.

Alternatively, the textured surface 40 can be produced by providing a plurality of depressions or dimples 44 therein as shown in FIG. 6. The dimples 44 are formed with sharply defined edges so as to create discontinuities in the surface 40 that produce the desired planing action.

Figure 7:
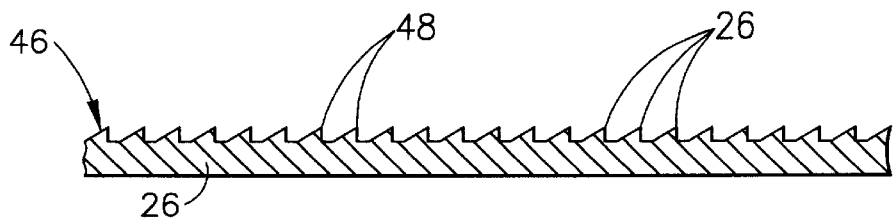
FIG. 7 is an enlarged cross-sectional view showing a second embodiment of the present invention.

FIG. 7 shows a second embodiment of the present invention in which the tiles 38 are not used. Instead, a roughened or abrasive surface texture is provided directly to all or a portion of the interior surface 46 of the containment casing 26. As with the first embodiment, the abrasive surface texture can be produced by forming a plurality of protuberances 48 on the interior surface 46. The protuberances 48 can comprise any sort of protrusion such as a plurality of sawtooth steps oriented against the direction of blade rotation (shown in FIG. 7), a plurality of sharp spikes, or pieces of a hard material impregnated in the surface 46. Alternatively, the abrasive surface texture can be produced by providing a plurality of sharp dimples therein. Preferably, the abrasive surface texture is applied to the complete circumference of the interior surface 46 for at least a portion of the axial length of the casing 26. The abrasive surface texture is preferably axially aligned with the fan blades 20 and can also be formed at locations fore and aft of the blades 20. This second embodiment will provide the same dulling action as the first embodiment, but not the ballistic barrier capability provided by the tiles.

The foregoing has described a containment casing for gas turbine engines having a textured surface that dulls sharp corners and edges of impacting fan blades. While specific embodiments of the present invention have been described, it will be apparent to those skilled in the art that various modifications thereto can be made without departing from the spirit and scope of the invention as defined in the appended claims.

What is claimed is:

1. In a turbomachine having a plurality of blades mounted to a disk, a blade containment system comprising an annular casing positioned in surrounding relationship with said blades and having an interior surface, at least a portion of said interior surface having an abrasive surface texture.

2. The blade containment system of claim 1 wherein said abrasive surface texture comprises a plurality of protuberances formed on said interior surface.

3. The blade containment system of claim 2 wherein said protuberances comprise sharp spikes.

4. The blade containment system of claim 2 wherein said protuberances comprise sawtooth steps.

5. The blade containment system of claim 4 wherein said sawtooth steps face the direction of blade rotation.

6. The blade containment system of claim 2 wherein said protuberances comprise pieces of a hard material impregnated in said interior surface.

7. The blade containment system of claim 1 wherein said abrasive surface texture comprises a plurality of dimples formed in said interior surface.

8. The blade containment system of claim 1 wherein said abrasive surface texture is axially aligned with said blades.

9. The blade containment system of claim 1 wherein said abrasive surface texture is located forward of said blades.

10. The blade containment system of claim 1 wherein said abrasive surface texture is located aft of said blades.

11. In a turbomachine having a plurality of blades mounted to a disk, a blade containment system comprising:

an annular casing positioned in surrounding relationship with said blades and having an interior surface; and a plurality of tiles secured to said interior surface, each one of said tiles having an abrasive surface texture formed thereon.

12. The blade containment system of claim 11 wherein said abrasive surface texture comprises a plurality of protuberances formed on each one of said tiles.

13. The blade containment system of claim 12 wherein said protuberances comprise sharp spikes.

14. The blade containment system of claim 12 wherein said protuberances comprise sawtooth steps.

15. The blade containment system of claim 14 wherein said sawtooth steps face the direction of blade rotation.

16. The blade containment system of claim 12 wherein said protuberances comprise pieces of a hard material impregnated in each one of said tiles.

17. The blade containment system of claim 11 wherein said abrasive surface texture comprises a plurality of dimples formed in each one of said tiles.

18. The blade containment system of claim 11 wherein said tiles are axially aligned with said blades.

19. The blade containment system of claim 11 wherein said tiles are located forward of said blades.

20. The blade containment system of claim 11 wherein said tiles are located aft of said blades.

21. In a turbomachine having a plurality of blades mounted to a disk, a blade containment system comprising:

an annular casing positioned in surrounding relationship with said blades and having an interior surface; and a plurality of tiles secured to said interior surface, each one of said tiles having a surface that faces said blades and each one of said surfaces having a plurality of discontinuities formed thereon to define an abrasive surface texture.

22. The blade containment system of claim 21 wherein said discontinuities comprise protuberances.

23. The blade containment system of claim 21 wherein said discontinuities comprise dimples.

* * * * *